(12) United States Patent
Ueda et al.

(10) Patent No.: US 10,008,183 B2
(45) Date of Patent: Jun. 26, 2018

(54) DISPLAY-AND-AUDIO OUTPUT CONTROL DEVICE

(71) Applicant: DENSO CORPORATION, Kariya, Aichi-pref. (JP)

(72) Inventors: Yoshihiro Ueda, Kariya (JP); Shigeo Kato, Kariya (JP); Hitoshi Sugiyama, Kariya (JP); Yuuichi Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 33 days.

(21) Appl. No.: 15/312,110

(22) PCT Filed: May 18, 2015

(86) PCT No.: PCT/JP2015/002485
§ 371 (c)(1),
(2) Date: Nov. 17, 2016

(87) PCT Pub. No.: WO2015/182056
PCT Pub. Date: Dec. 3, 2015

(65) Prior Publication Data
US 2017/0076696 A1    Mar. 16, 2017

(30) Foreign Application Priority Data
May 28, 2014    (JP) .................. 2014-110260

(51) Int. Cl.
*G08B 21/00*    (2006.01)
*G09G 5/12*    (2006.01)
(Continued)

(52) U.S. Cl.
CPC ............. *G09G 5/12* (2013.01); *B60C 9/00* (2013.01); *B60R 16/02* (2013.01); *G06F 3/048* (2013.01);
(Continued)

(58) Field of Classification Search
CPC .................................. G09G 5/12; B60Q 9/00
USPC ......... 340/425.5, 691.1, 691.3, 691.4, 691.6, 340/384.7
See application file for complete search history.

(56) References Cited

U.S. PATENT DOCUMENTS 6,208,932 B1    3/2001 Ohmura et al.
2008/0211654 A1    9/2008 Kasamatsu
(Continued)

FOREIGN PATENT DOCUMENTS

JP    H10104003 A    4/1998
JP    2001304900 A    10/2001
(Continued)

*Primary Examiner* — Jeffery Hofsass
(74) *Attorney, Agent, or Firm* — Harness, Dickey & Pierce, P.L.C.

(57) ABSTRACT

A display-and-audio output control device is provided. In the display-and-audio output control device, a display control unit preferentially allocates a display content having high display information value to a display area out of multiple display contents. An audio control unit allocates an audio content to an audio output device. An obtaining unit obtains audio information amounts of the audio contents and correspondence information between the audio contents and the display contents. Based on the audio information amount of a specific audio content, the management unit changes the display information value of a specific display content associated with the specific display content. The display control unit employs the display information value changed by the management unit to allocate the specific display content to the area for display.

2 Claims, 10 Drawing Sheets

(51) Int. Cl.
  *B60R 16/02*  (2006.01)
  *G06F 3/14*  (2006.01)
  *G06F 3/048*  (2013.01)
  *B60C 9/00*  (2006.01)
  *G06F 3/16*  (2006.01)
  *G09G 5/00*  (2006.01)
  *G09G 5/14*  (2006.01)

(52) U.S. Cl.
  CPC ............... *G06F 3/14* (2013.01); *G06F 3/165* (2013.01); *G09G 5/003* (2013.01); *G06F 3/1423* (2013.01); *G09G 5/14* (2013.01); *G09G 2320/08* (2013.01); *G09G 2340/0464* (2013.01); *G09G 2340/14* (2013.01); *G09G 2380/10* (2013.01)

(56) References Cited

U.S. PATENT DOCUMENTS

| | | |
|---|---|---|
| 2012/0215404 A1 | 8/2012 | Sugiyama et al. |
| 2015/0089426 A1 | 3/2015 | Ukai |
| 2015/0363155 A1 | 12/2015 | Hayashi et al. |

FOREIGN PATENT DOCUMENTS

| | | |
|---|---|---|
| JP | 2007212574 A | 8/2007 |
| JP | 2008201217 A | 9/2008 |
| JP | 2008213609 A | 9/2008 |
| JP | 2012190440 A | 10/2012 |
| JP | 2013254478 A | 12/2013 |

FIG. 2A

AUDIO CONTENT ATTRIBUTES

| AUDIO CONTENT |
|---|
| DELAY TIME LIMIT<br>CONTENT LENGTH<br>SIGNIFICANT INFO END TIME<br>INTERRUPTIBLE TIME<br>LIFE<br>CATEGORY<br>AUDIO INFO AMOUNT<br>ASSOCIATED DISPLAY CONTENT<br>OUTPUT STATE |

FIG. 2B

AUDIO CONTENT VALUE BY CATEGORY

| CATEGORY | VALUE<br>(PRIORITY DEGREE) |
|---|---|
| CATEGORY 1 | 10 |
| CATEGORY 2 | 9 |
| CATEGORY 3 | 8 |
| CATEGORY 4 | 7 |

FIG. 2C

EXAMPLE AUDIO INFO AMOUNTS

| AUDIO CONTENTS | AUDIO INFO AMOUNTS | CONTENTS OF AUDIO CONTENTS |
|---|---|---|
| ALARM SOUND | SMALL | "Pong" |
| VERBAL SOUND (SHORT) | MEDIUM | "Mail to you." |
| VERBAL SOUND (LONG) | LARGE | "The toll is xx yen." |

| AUDIO INFO AMOUNT | COEFFICIENT K |
|---|---|
| SMALL | 2 |
| MEDIUM | 1 |
| LARGE | 0.5 |

FIG. 9

CASE 1:

RESULT OF AUDIO OUTPUT ARBITRATION

OUTPUT-TARGET AUDIO CONTENT : ETC WARNING SOUND "Bleep"
AUDIO INFO AMOUNT : SMALL (COEFFICIENT K: 2)
ASSOCIATED DISPLAY CONTENT : ETC WARNING (DISPLAY CONTENT A)

DISPLAY CONTENT A : ETC WARNING
(INFO VALUE: 10)

Set an ETC card.

⬇

INFO VALUE: 10 × 2=20

DISPLAY CONTENT B :
WIRELESS CONNECTION NOTIFY
(INFO VALUE: 8)

Wirelessly connected
with smartphone.

⬇

INFO VALUE: 8

⬇

RESULTANT DISPLAY

AUDIO OUTPUT
"Bleep"

Set an ETC card.

AREA WITH HIGH AREA VALUE
DISPLAY CONTENT A

Wirelessly connected
with smartphone.

AREA WITH LOW AREA VALUE
DISPLAY CONTENT B

FIG. 10

CASE 2:

RESULT OF AUDIO OUTPUT ARBITRATION

OUTPUT-TARGET AUDIO CONTENT : ETC TOLL NOTIFY "The toll is xx yen."
AUDIO INFO AMOUNT : LARGE (COEFFICIENT K: 0.5)
ASSOCIATED DISPLAY CONTENT : ETC TOLL (DISPLAY CONTENT A)

DISPLAY CONTENT A : ETC TOLL
(INFO VALUE: 10)

 The toll is xx yen.

⇩

INFO VALUE: 10 × 0.5 = 5

DISPLAY CONTENT B :
WIRELESS CONNECTION NOTIFY
(INFO VALUE: 8)

Wirelessly connected
with smartphone.

⇩

INFO VALUE: 8

⇩

RESULTANT DISPLAY

─AUDIO OUTPUT─
"The toll is xx yen."

Wirelessly connected
with smartphone.

AREA WITH HIGH AREA VALUE
DISPLAY CONTENT B

 The toll is xx yen

AREA WITH LOW AREA VALUE
DISPLAY CONTENT A

DISPLAY-AND-AUDIO OUTPUT CONTROL DEVICE

CROSS REFERENCE TO RELATED APPLICATIONS

This application is a U.S. National Phase Application under 35 U.S.C. 371 of International Application No. PCT/JP2015/002485 filed on May 18, 2015 and published in Japanese as WO 2015/182056 A1 on Dec. 3, 2015. This application is based on and claims the benefit of priority from Japanese Patent Application No. 2014-110260 filed on May 28, 2014.

The entire disclosures of all of the above applications are incorporated herein by reference.

TECHNICAL FIELD

The present disclosure relates to a display-and-audio output control device which performs output control on outputs of display contents and audio contents via a display device and audio output device prepared in a vehicle interior.

BACKGROUND ART

Information provided in a vehicle interior widely ranges. When multiple output data candidates are present at about a same time, an output device for presenting such data performs output arbitration to limit output targets or to appropriately distribute the output candidates to plural output destinations.

Patent Literature 1 discloses a technology for preferentially displaying a high priority image data to a high priority display area among a plurality of display-requested image data based on display priorities of the respective image data. Patent Literature 2 discloses a technology for adjusting respective audio-information output periods to perform audio output when plural audio-data output requests are temporally close to one another.

PRIOR ART LITERATURE

Patent Literature

Patent Literature 1: JP2008-213609A
Patent Literature 2: JP2007-212574A

SUMMARY OF INVENTION

The inventors of the present application have found that the following problems to be solved are present in existing technologies in which output arbitration is made independently for provided display data (hereinafter referred to as "display contents") and for provided audio data (hereinafter referred to as "audio contents").

A display content and an audio content corresponding to each other may be outputted together as one set for integrated information presentation. In such cases, even though the information presentation requires outputting both the display content and the audio content in its nature, the display content may not be displayed as a result of lost to another display content in output arbitration. When it occurs, of the display content and the audio content corresponding to each other, only the audio content can be outputted. This is inadequate information presentation to a user.

Alternatively, even in cases a display content and an audio content corresponding to each other are outputted together as one set for the integrated information presentation, if the audio content contains an adequate amount of information, the audio content alone may be enough for the information presentation to some extents. When the display content is displayed in such a situation where the audio content alone is enough for the information presentation, it may eliminate opportunities of presenting other display contents that have lost to the display content in output arbitration.

It is an object of the present disclosure to provide a technology for appropriately presenting information by managing information value of mutually corresponding audio contents and display contents.

A display-and-audio output control device comprises a display control unit, an audio control unit, an obtaining unit and a management unit. Out of display contents set as display targets, the display control unit preferentially allocates a display content having high display information value to a display area set on a screen of a display device mounted in a vehicle and displays the display content. The display information value represents an importance degree of information. The audio control unit allocates an audio content set as an output target to an audio output device mounted in the vehicle to have the audio contents audio-outputted. When a plurality of the audio contents set as the output targets temporally overlap each other, the audio control unit determines, based on a predetermined arbitration criterion, an audio content to be preferentially outputted and has the determined audio content preferentially audio-outputted. The obtaining unit obtains audio information amounts representing amounts of audio information represented by the audio contents and correspondence information representing correspondence between the audio contents and the display contents. The management unit manages display information value representing importance degrees of information represented by the display contents.

Based on the audio information amount of a specific audio content to undergo audio output execution by the audio control unit, the management unit changes the display information value of a specific display content associated with the specific display content as represented by the correspondence information of the specific audio content. The display control unit employs the display information value changed by the management unit to allocate the specific display content set as the display target to the area for display.

According to the above display-and-audio output control device, display priority of a display content associated with an audio content set as an output target as a result of audio output arbitration is increased or decreased by changing the information value of the display content based on the audio information amount of the audio content. To be specific, as the audio information amount of an audio content is larger, the display information value of a display content associated with the audio content can be made smaller, and, as the audio information amount of an audio content is smaller, the display information value of a display content associated with the audio content can be made larger.

For example, when an audio content alone has an insufficient amount of information and presentation of an associated display content is imperative, the associated display content can be preferentially displayed by increasing the information value of the display content. This way enables information presentation using both an audio content and a display content. Alternatively, when an audio content has a large amount of information and information presentation can be achieved to some extent with the audio content alone, the decrease in the information value of a corresponding display content enables a competing display content to be preferentially displayed. In this way, while achieving information presentation using an audio content, a competing display content can be preferentially displayed, thereby achieving multifaceted information presentation.

BRIEF DESCRIPTION OF DRAWINGS

The above and other objects, features and advantages of the present disclosure will become more apparent from the following detailed description made with reference to the attached drawings. In the drawings:

FIG. 2A is a diagram showing attributes of an audio content;

FIG. 2B is a diagram showing audio content value by category;

FIG. 2C is a diagram showing example audio information amounts;

FIG. 9 is a diagram showing a concrete example of display control execution; and FIG. 10 is a diagram showing another concrete example of display control execution.

EMBODIMENT FOR CARRYING OUT INVENTION

In the following, an embodiment of the present disclosure will be described with reference to drawings. The present disclosure is not limited to the following embodiment and can be applied in various forms.

Description of Configuration of Display-and-Audio Output Control Device

Figure 1:
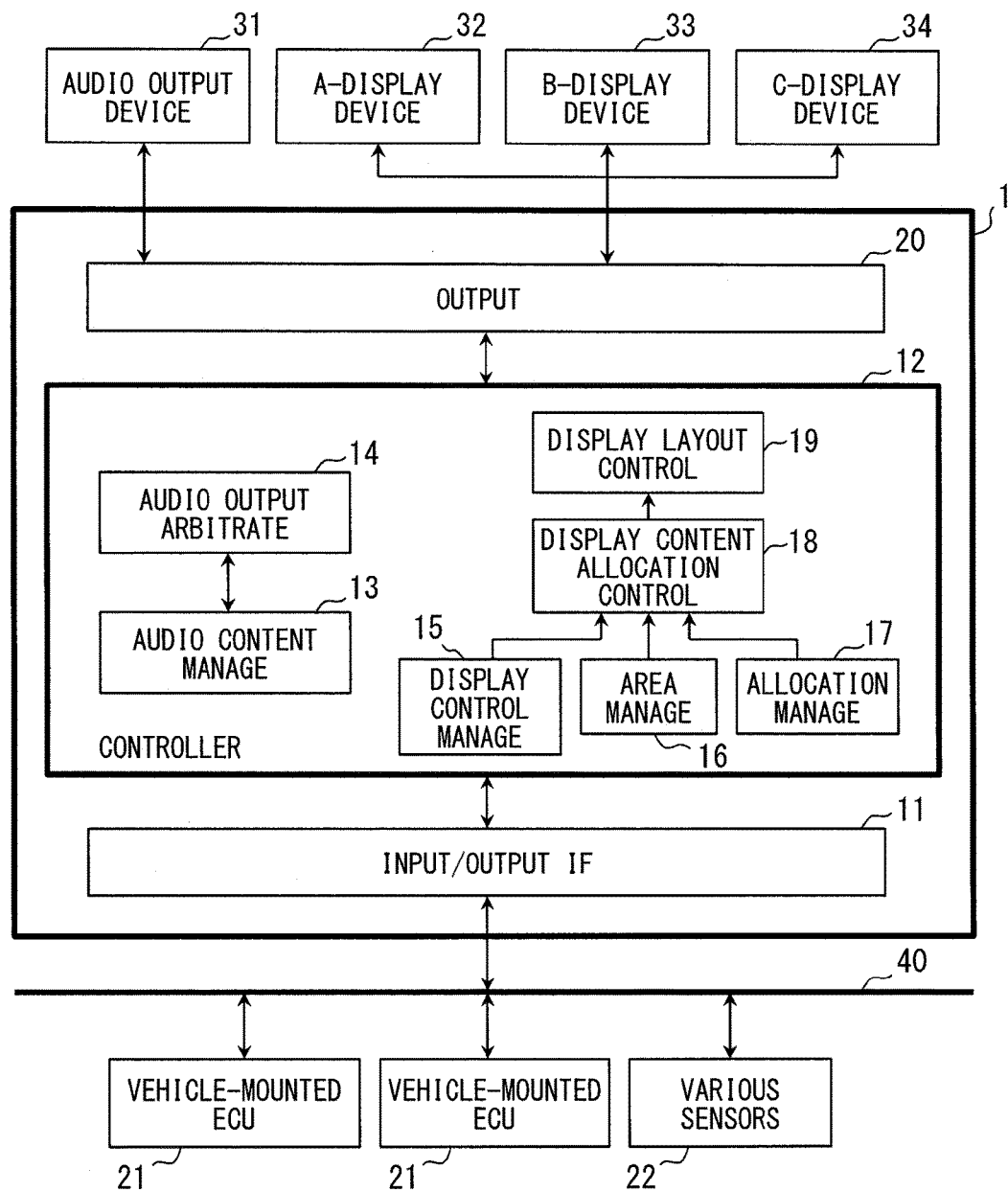
FIG. 1 is a block diagram showing a schematic configuration of a display-and-audio output control device.

As illustrated in FIG. 1, a display-and-audio output control device 1 is connected with a vehicle-mounted device such as an audio output device 31, three display devices 32, 33 and 34, plural vehicle-mounted ECUs 21, and vehicle-mounted devices including various sensors 22. In the following, the three display devices 32 to 34 will be referred to, as required, as "A-display device 32," "B-display device 33," and "C-display device 34" for differentiation. The three A- to C-display devices 32 to 34 are realized, for example, as a head-up display, a meter panel and a liquid crystal display to display a navigation map, but are not limited to such displays.

The display-and-audio output control device 1 is a vehicle-mounted device which displays display contents and outputs audio contents. The display contents and audio contents are obtained from the vehicle-mounted ECUs 21 and various sensors 22. The display-and-audio output control device 1 is an information processing device mainly with a CPU and memories, not shown, and is provided with such functional elements as an input/output interface 11, a control unit 12, and an output unit 20.

The input/output interface 11 is a communication interface unit used to transmit/receive information via a vehicle-mounted network 40 (e.g. CAN). The display-and-audio output control device 1 is communicably connected with the vehicle-mounted ECUs 21 and various sensors 22 via the input/output interface 11. The vehicle-mounted ECUs 21 are electronic control units to execute applications for providing various kinds of information. The vehicle-mounted ECUs 21 include, for example, a navigation ECU, a vehicle-mounted device incorporated in an electronic toll collection system ETC (registered trademark), and an audio ECU. The various sensors 22 include, for example, a vehicle speed sensor, an engine speed sensor, an outside air temperature sensor for detecting the temperature outside the vehicle, and a water temperature sensor for detecting the temperature of engine cooling water. However, the various sensors 22 are not limited to these sensors.

When a display content event or an audio content output event occurs in the vehicle-mounted ECUs 21 or various sensors 22, the display-and-audio output control device 1 having the above-described configuration can obtain the display or audio content via a network. The contents obtained include, for example, "route guidance information" provided by a navigation system, "toll information" provided by an ETC, "audio information" provided by an audio system, and data such as "vehicle speed," "engine rotation speed," and "outside temperature" detected by various sensors 22.

The audio contents and display contents obtained by the input/output interface 11 are inputted to the control unit 12. The control unit 12 includes an audio content management unit 13, an audio output arbitration unit 14, a display content management unit 15, an area management unit 16, an allocation management unit 17, a display content allocation control unit 18, and a display layout control unit 19. The audio content management unit 13 corresponds to an obtaining unit. The audio output arbitration unit 14 corresponds to an audio control unit. The display content management unit 15 corresponds to a management unit. The display content allocation control unit 18 and the display layout control unit 19 correspond to a display control unit.

The audio content management unit 13 has a function to manage audio contents. The audio content management unit 13 stores various attributes associated with various audio contents as shown in FIG. 2A as supplementary information for use in audio content output arbitration.

As illustrated in FIG. 2A, the audio content management unit 13 defines attributes such as "delay time limit," "content length," "significant information end time," "interruptible time," "life," "category," "audio information amount," "associated display content," and "output state".

The delay time limit is information representing the time allowable between occurrence of an audio output event and output of an audio content. For a high-urgency audio content to be quickly presented to a user, the delay time limit is set to be relatively short. For a low-urgency audio content, a relatively long delay time limit is set.

The content length is information representing the time taken to output a complete audio content. The significant information end time is information representing the time at which conveyance of the significant content of an audio content currently being outputted is expected to be completed. The significant information end time of an audio content can be calculated, for example, by adding the content length of the audio content to the output start time of the audio content. Alternatively, when insignificant end-of-sentence wording is omissible from of an audio content, the significant information end time can be set to be shorter than the content length. To be specific, for audio content "Turn right ahead, please," the significant information end time can be set based on the time taken until when "Turn right ahead" has been outputted.

The interruptible time is information representing a time at which an audio content being outputted presents, for example, a paragraph break representing a delimitation of meaning. The life is information representing a valid period within which, counted from the time of occurrence of an audio output event in an application, conveyance of an audio content is required to be completed. The life may be either a time preset in the system including the display-and-audio output control device 1 or a time specified in the application that has requested the audio output event. For example, when the life is not specified in the application that has issued an audio output request, the life may be set to equal the delay time limit plus the content length. Alternatively, the application that has requested an audio output request may specify the life as the time of occurrence of an audio output event plus one hour (output within one hour desired). In this way, a specific time limit can be specified.

The category is information defining the type of an audio content. In the category, information is classified according to the purpose and contents of the audio content, for example, into safety notification, fault notification, route guidance, toll list, and entertainment information. As illustrated in FIG. 2B, value (priority degree) of audio content categories is defined. In the present embodiment, it is assumed that a table defining audio content category value is pre-stored in a memory device of the display-and-audio output control device 1.

The audio information amount is information representing the amount of information represented by an audio content. To be specific, as illustrated in FIG. 2C, for an audio content of a non-verbal sound, for example, like an alarm sound "pong," the audio information amount is set to "small." Also, for an audio content of a relatively short verbal sound representing a very small number of words like "Mail to you," the audio information amount is set to "medium." Also, for an audio content of a relatively long verbal sound like "The toll is xx yen," the audio information amount is set to "large."

The output state is information indicating whether or not the audio content is an output target. The output state is set to either "active state" indicating that the audio content is an output target or "inactive state" indicating that the audio content is not an output target. To be specific, it is conceivable to make switching between "active state" and "inactive state" based on vehicle condition and user operation. For example, when the user turns on an audio switch, the "audio information" audio content enters an "active state" and, when the audio switch is turned off, the "audio information" audio content enters an "inactive state."

When audio output arbitration is made for plural overlapping audio output events, the audio content management unit 13 provides the audio output arbitration unit 14 with the audio content attributes corresponding to the respective audio output events. The audio output arbitration unit 14 makes audio output arbitration between the audio contents obtained from the vehicle-mounted ECUs 21 and various sensors 22 based on the attributes managed in the audio content management unit 13. The audio output arbitration unit 14 makes arbitration, for example, to arrange an audio output schedule taking into account the time concept and the value associated with each audio content. The processing performed by the audio output arbitration unit 14 will be described in detail later. The output unit 20 outputs an audio output signal to the audio output device 31 for audio outputting, based on the audio content outputted as a result of the arbitration by the audio output arbitration unit 14.

Figure 3A:
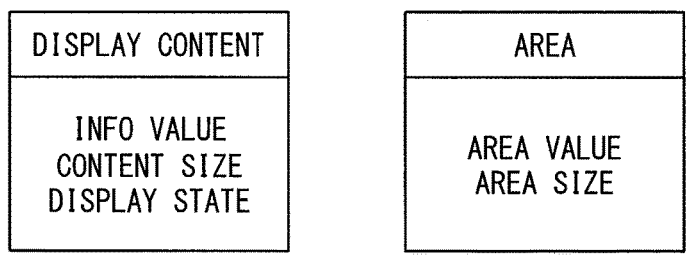
FIG. 3A is a diagram showing attributes of a display content and an area.

The display content management unit 15 has a display content management function. The display content management unit 15 manages each display content associating it with, as shown in FIG. 3A, three attributes, "information value," "content size," and "display state." The information value represents the degree of importance of a display content. In general, a display content with a higher degree of urgency like in the case of warning information has high information value, next lower information value is provided to display contents concerning vehicle traveling condition. Display contents concerning navigation and audio information have relatively low information values. The content size indicates an area size required to display a display content and is represented, for example, in vertical and horizontal pixel counts.

The display state is information indicating whether or not the display content is a display target. The display state is set to either "active state" indicating that the display content is a display target or "inactive state" indicating that the display content is not a display target. To be specific, it is conceivable to make switching between "active state" and "inactive state" based on vehicle condition and user operation. For example, when the shift position is R, the "rear-view monitor" display content enters an "active state" and, when the shift position is other than R, the "rear-view monitor" display content enters an "inactive state." Also, when the user turns on an audio switch, the "audio information" display content enters an "active state" and, when the audio switch is turned off, the "audio information" display content enters an "inactive state."

The area management unit 16 has a function for managing plural areas as display areas. The areas are set for three A-to-C display devices 32 to 34. The area management unit 16 manages the areas of the three A-to-C display devices 32 to 34 in a similar manner. That is, the area of the A-display device 32 and the area of the B-display device 33 are managed alike. The area management unit 16, however, manages the respective areas associating each with two attributes "area value" and "area size" as shown in FIG. 3A.

The area value represents the degree of importance of an area. In general, for an area with higher visibility, a higher area value is set. For example, a head-up display area which makes use of windshield glass has a high area value. The area size indicates the size of an area and is, like the content size, represented, for example, in vertical and horizontal pixel counts.

Figure 4A:
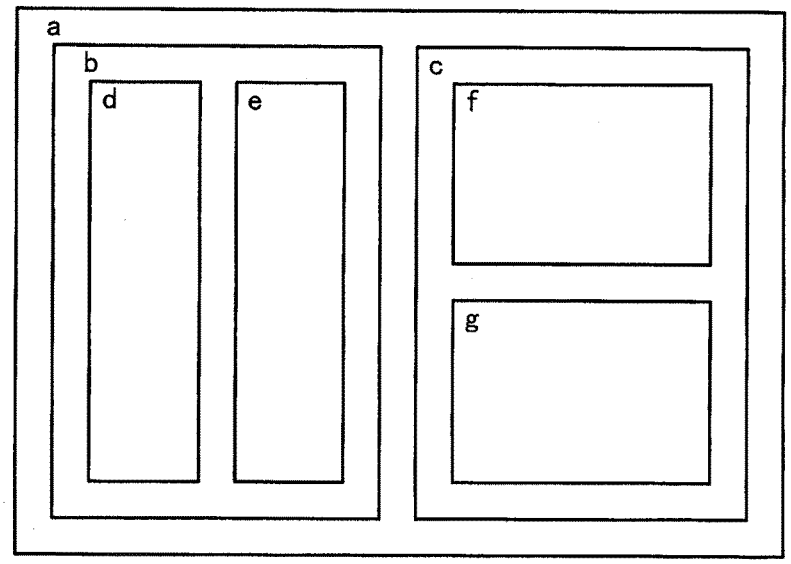
FIG. 4A is a diagram showing a hierarchical area data structure in an area management unit.
Figure 4B:
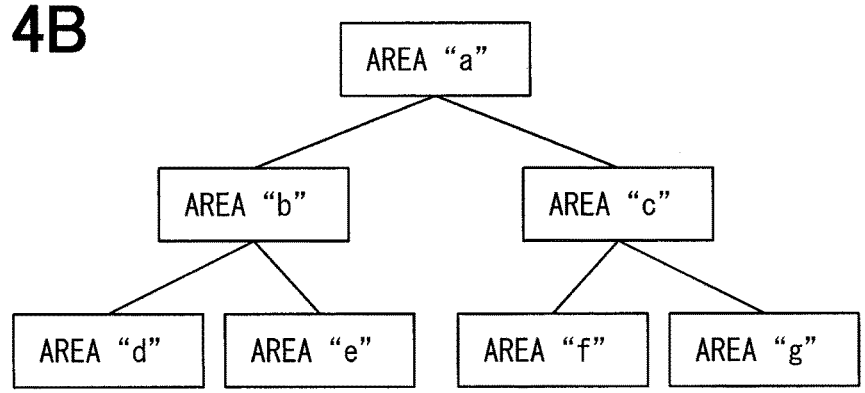
FIG. 4B is a diagram showing the hierarchical area data structure in the area management unit.
Figure 4C:
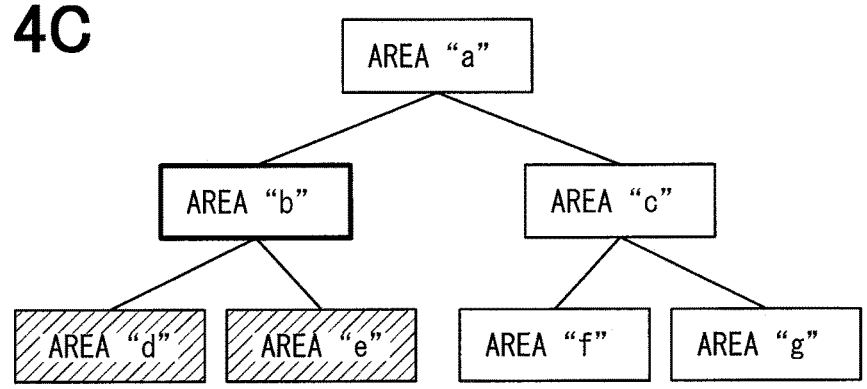
FIG. 4C is a diagram showing the hierarchical area data structure in the area management unit.

The area management unit 16 manages the areas of the A-to-C display devices 32 to 34 in a hierarchical data structure. In the example case of the A-display device 32, the area is managed as shown in FIGS. 4A to 4C. Referring to FIG. 4A, assume that the display area of the A-display device 32 is set as follows: area a covers the whole screen; areas b and c make up right and left halves of area a, respectively; areas d and e make up right and left halves of area b, respectively; and areas f and g make up upper and lower halves of area c, respectively.

With the areas set as described above, area a is managed as the highest-tier area. Areas b and c are managed in a tier immediately below the tier of area a; and areas d and e and areas f and g are managed in tiers immediately below the tier of areas b and c, respectively.

In this setup, when a display content is allocated to, for example, area b, areas d and e in the lower tier are determined to be unusable as shown in FIG. 4C. Note that, when, of areas b and c in the tier immediately below area a, only area b is allocated with a display content (when areas c, f, and g are not used), the display content is only required to be inside area a. For example, the display content may be centered on the screen so as to range over areas b and c.

In the present embodiment using the display content management unit 15 and the area management unit 16 as described above, the display content allocation unit 18 compares the information value of a display content and the area value of an area and allocates the display content to the area, as a rule, only when the information value of the display content is larger than the area value of the area. In the following, the information value and area value may each be referred to simply as "value" and the content size and area size may each be referred to simply as "size."

The display content allocation control unit 18 allocates display contents to areas by taking into consideration not only the "value" of the contents and areas but also their "size." When display contents are allocated to areas, the display layout control unit 19 displays the display contents in the areas.

Figure 3B:
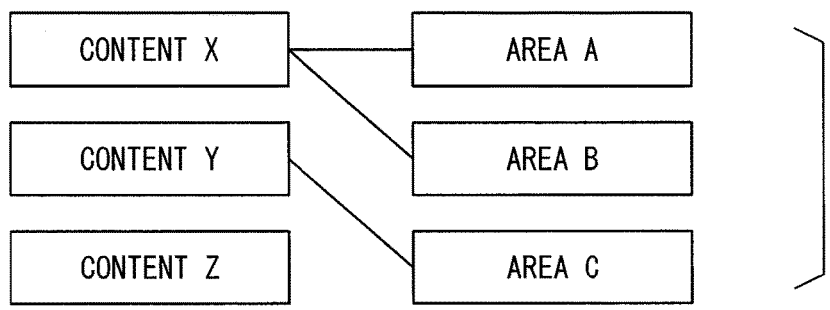
FIG. 3B is a diagram showing correspondence between display contents and areas.

The processing to allocate, based on the attributes of display contents and areas, contents to areas may be referred to as "dynamic allocation" processing. Besides the contents subject to dynamic allocation, there are some contents to be allocated to predetermined areas. Such allocation may be referred to as "static allocation." The correspondence between such predetermined contents and areas is managed by the allocation management unit 17. In the allocation management unit 17, the correspondence between, for example, content X and areas A and B is stored as shown in FIG. 3B. In this case, content X is to be allocated to area A or B. The allocation management unit 17 also stores the correspondence between content Y and area C. In this case, content Y is to be allocated to area C.

Description of Audio Output Processing

The procedure of audio output processing performed by the control unit 12 of the display-and-audio output control unit 1 will be described below with reference to the flowchart shown in FIG. 5. The processing is performed repeatedly while the ignition key is on.

First, assume that an audio output event A has occurred (S100). In S102, the control unit 12 receives an audio output request A for outputting an audio content associated with an audio output event A from an application serving as a request source via the input/output interface 11. Next, in S104, on the condition that no audio content is being outputted based on another audio output request, the control unit 12 starts outputting the audio content associated with the audio output request A via the output unit 20.

Assume that, while the audio content associated with the audio output request A is being outputted, another audio output event B has occurred (S106). In S108, the control unit 12 receives an audio output request B for outputting an audio content associated with an audio output event B from an application serving as a request source via the input/output interface 11.

In the next step S110, the control unit 12 has audio output arbitration processing performed by the audio output arbitration unit 14 between the earlier-issued audio output request A and the later-issued audio output request B. The detailed procedure of the audio output arbitration processing will be described later. In S112, the control unit 12 carries out an audio output based on the result of the arbitration processing. In this step, the control unit 12 first outputs the audio content set as an output target via the output unit 20. After output of the audio content set as an output target is completed, the control unit 12 outputs an audio content, if any, stored in an output standby buffer via the output unit 20. After outputting the audio contents, the control unit 12 ends this processing.

Description of Audio Output Arbitration Processing

The procedure of audio output arbitration processing performed by the audio output arbitration unit 14 included in the control unit 12 will be described with reference to the flowchart shown in FIG. 6. This processing is performed in S110 of the above audio output processing (see FIG. 5).

In S200, the audio output arbitration unit 14 obtains, based on the attributes of the audio content associated with the earlier-issued audio output request A obtained by the audio content management unit 13, the significant information end time of the earlier-requested audio content. In S202, the audio output arbitration unit 14 obtains, based on the attributes of the audio content associated with the later-issued audio output request B obtained by the audio content management unit 13, the delay time limit of the later-requested audio content.

In S204, the audio output arbitration unit 14 compares the significant information end time of the earlier-requested audio content and the delay time limit of the later-requested audio content and makes the processing branch depending on the time relationship between them. In the present case, when the significant information end time of the earlier-requested audio content is earlier than or the same as the delay time limit of the later-requested audio content (S204: YES), the audio output arbitration unit 14 advances to S206. In contrast, when the significant information end time of the earlier-requested audio content is later than the delay time limit of the later-requested audio content (S204: NO), the audio output arbitration unit 14 advances to S210.

In S206 entered when the significant information end time of the earlier-requested audio content is earlier than or the same as the delay time limit of the later-requested audio content, the audio output arbitration unit 14 stores later-requested audio content output data in the output standby buffer. The output standby buffer is a memory area for temporarily storing an audio content to be outputted later until output of the audio content to be outputted with priority is completed. In the next step S208, the audio output arbitration unit 14 sets the earlier-requested audio content output data as an output target and ends the processing.

In S210 entered when the significant information end time of the earlier-requested audio content is later than the delay time limit of the later-requested audio content, the audio output arbitration unit 14 obtains the value of the earlier-requested audio content. Also, in S212, the audio output arbitration unit 14 obtains the value of the later-requested audio content. In these steps, the audio output arbitration unit 14 obtains the values (degrees of priority) of the audio contents from a table in which, based on the categories of audio contents associated with individual audio output requests, the values (degrees of priority) of the audio contents defined by category are pre-stored.

In S214, the audio output arbitration unit 14 compares the value of the earlier-requested audio content and the value of the later-requested audio value and determines the higher-valued audio content to be of "priority" and the lower-valued audio content to be of "non-priority." When the earlier-requested audio content and the later-requested audio content have equal value, the earlier-requested audio content is determined to be of "priority" and the later-requested audio content is determined to be of "non-priority." In the next step S216, the audio output arbitration unit 14 obtains, from the attributes of the non-priority audio content, the life of the non-priority audio content. In S218, the audio output arbitration unit 14 obtains, from the attributes of the priority audio content, the significant information end time of the priority audio content. In S218, the audio output arbitration unit 14 obtains, from the attributes of the priority audio content, the significant information end time of the priority audio content.

In S220, the audio output arbitration unit 14 compares the significant information end time of the priority audio content and the life of the non-priority audio content and makes the processing branch depending on the time relationship between them. In the present case, when the significant information end time of the priority audio content is earlier than or the same as the life of the non-priority audio content (S220: YES), the audio output arbitration unit 14 advances to S222. In S222, the audio output arbitration unit 14 stores non-priority audio content output data in the output standby buffer.

In contrast, when the significant information end time of the priority audio content is later than the life of the later-requested audio content (S220: NO), the audio output arbitration unit 14 advances to S224. In S224, the audio output arbitration unit 14 rejects the output request for the non-priority audio content. In S226, the audio output arbitration unit 14 sets priority audio content output data as an output target and ends the processing.

Description of Display Control Processing

The procedure of display control processing performed by the control unit 12 of the display-and-audio output control unit 1 will be described below with reference to the flowchart shown in FIG. 7. The processing is performed repeatedly while the ignition key is on.

Figures 8A, 8B:
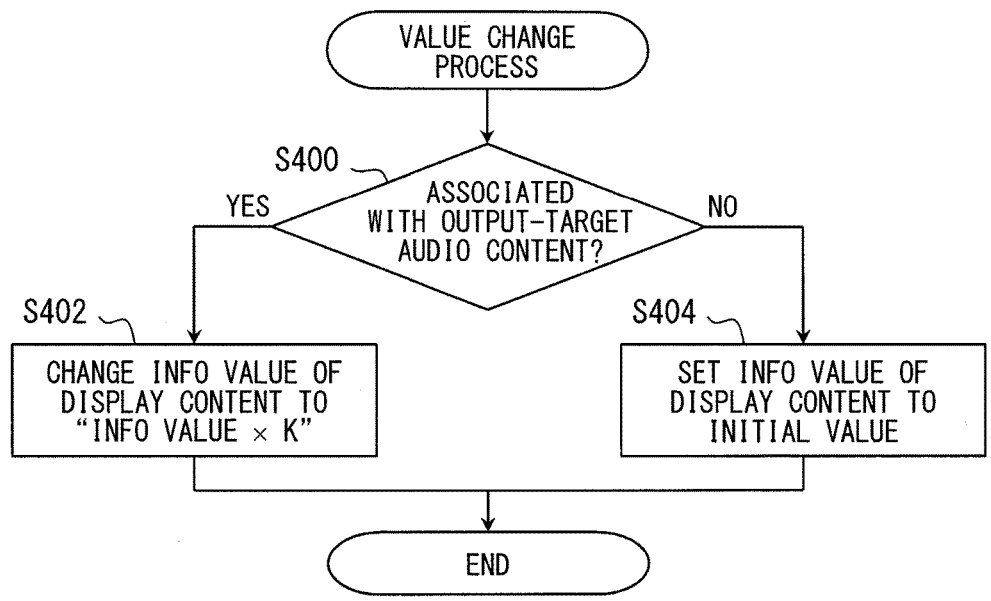
FIG. 8A is a flowchart of value change processing.
FIG. 8B is a diagram showing coefficients K corresponding to audio information amounts.

In S300, the control unit 12 initializes variable n to "1". The variable n represents a display content As the variable n is incremented, the display contents managed in the display content management unit 15 are processed in order, i.e. from the first display content →the second display content →the third display content - - - . In S302, the control unit 12 performs value change processing on the n-th display content as a processing target. This processing is for changing, based on the audio information amount of the output-target audio content, the information value of the associated display content. The procedure of the value change processing will be described below with reference to FIG. 8A showing a flowchart and FIG. 8B.

Figure 5:
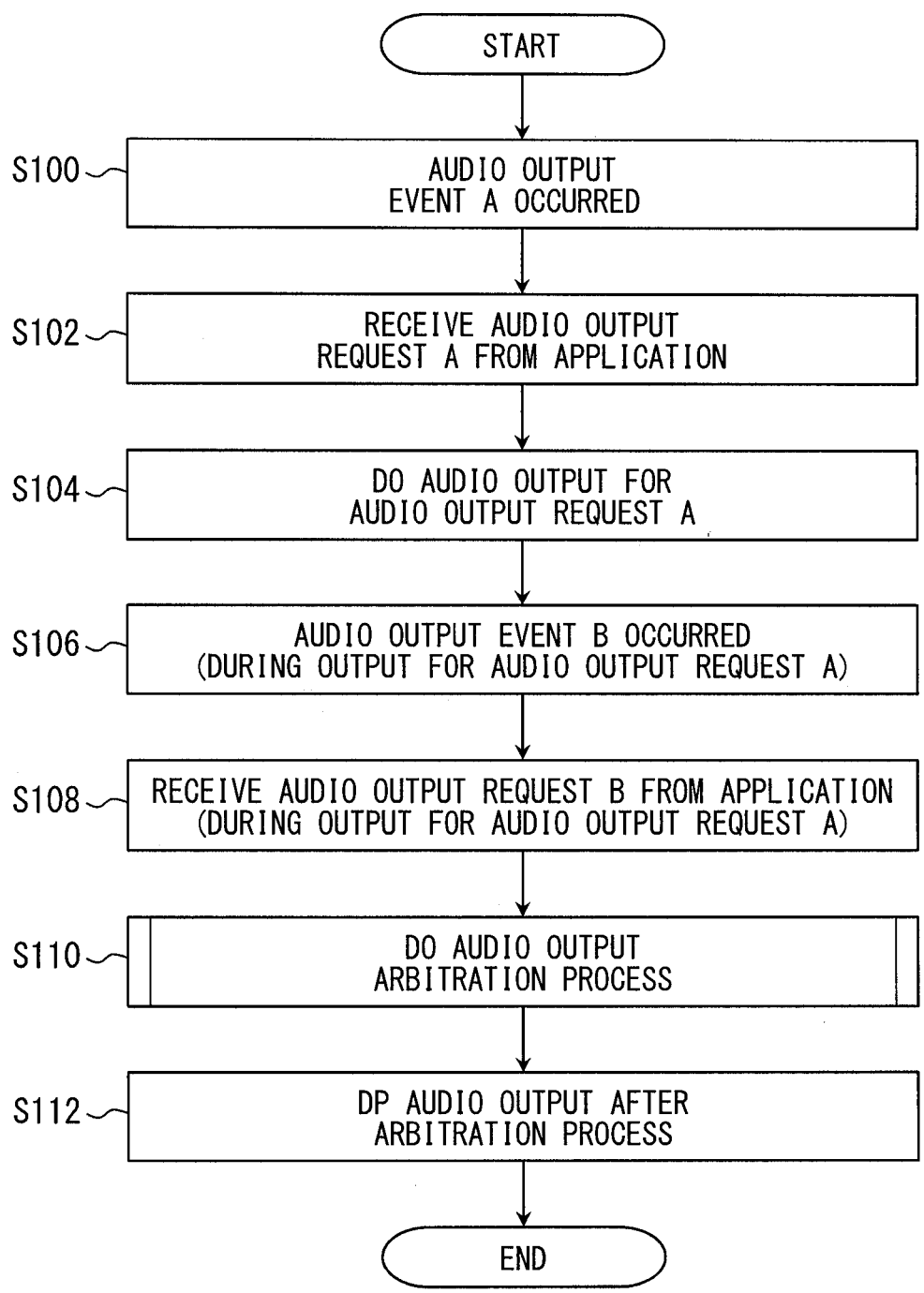
FIG. 5 is a flowchart showing the procedure of audio output processing.
Figure 6:
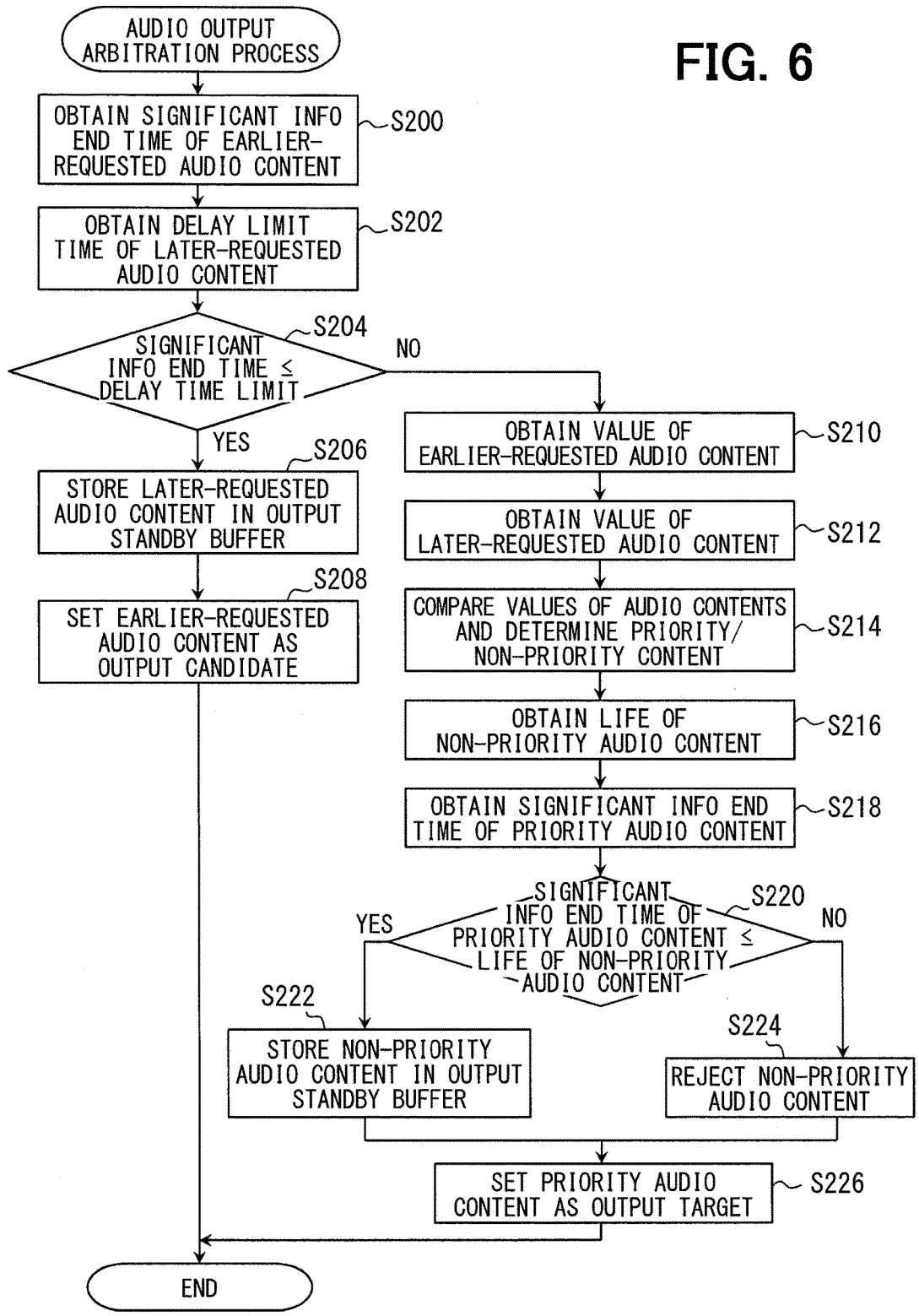
FIG. 6 is a flowchart showing the procedure of audio output arbitration processing.

In S400, the control unit 12 determines whether or not the display content set as the processing target is associated with the audio content set as the output target in the above audio output processing (FIG. 5). To be specific, the control unit 12 refers to the attributes (see FIG. 2A) of the output-target audio content and determines whether or not the processing-target display content is indicated as an associated content.

When the processing-target display content is associated with the output-target audio content (S400: YES), the control unit 12 advances to S402. In S402, the control unit 12 changes the information value of the processing-target display content to the value of "information value (initial value)×K."

The above "K" represents a coefficient, which is predetermined based on the audio information amount represented by the attributes of the output-target audio content. In the present embodiment, coefficient K is set to be larger when the audio information amount is smaller and to be smaller when the audio information amount is larger. To be specific, as illustrated in FIG. 8B, coefficient K is 2 when the audio information amount is small, 1 when the audio information amount is medium, and 0.5 when the audio information amount is large. Thus, when the audio information amount of the output-target audio content is smaller, the information value of the associated display content is set to be larger and, when the audio information amount of the output-target audio content is larger, the information value of the associated display content is set to be smaller.

In contrast, when the processing-target display content is not associated with the output-target audio content (S400: NO), the control unit 12 advances to S404. In S404, the control unit 12 sets the information value of the processing-target display content to the initial value.

Figure 7:
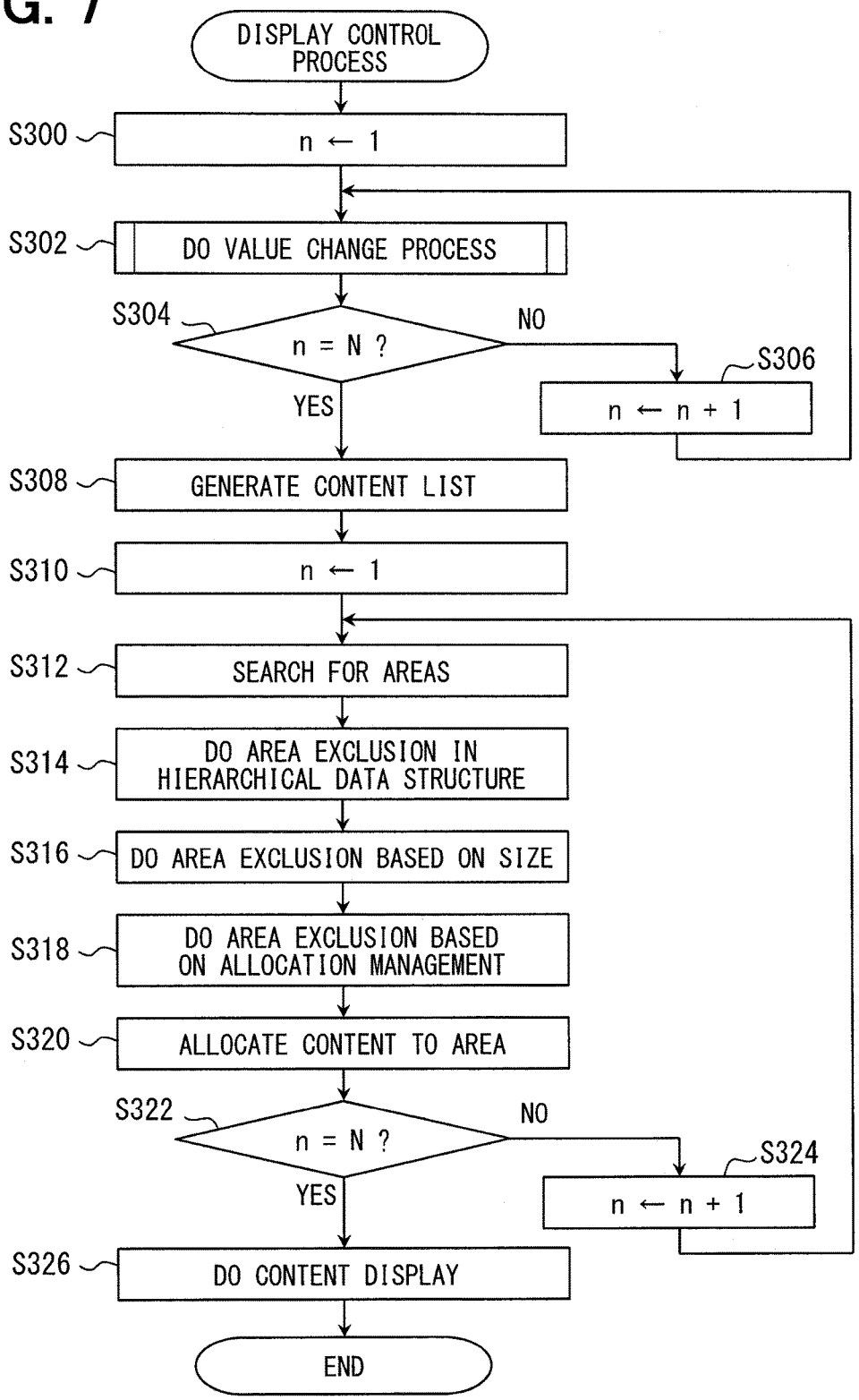
FIG. 7 is a flowchart showing the procedure of display control processing.

Description returns to the flowchart shown in FIG. 7. In S304, the control unit 12 determines whether or not the variable n equals the number N of display contents. This processing is for determining whether or not all display contents have been processed. When, in this processing, n=N (S304: YES), the control unit 12 advances to S308. In contrast, when n≠N (S304: NO), i.e. when there is any display content which has not been processed, the variable n is incremented in S306 and the processing of S302 is repeated.

In S308, the control unit 12 generates a content list. In this processing, display contents with the display state attribute being "active state" are extracted and are rearranged in descending order of information value. In the present case, as many as N display contents are to be rearranged. The processing of S300 to S308 is realized as a function of the display content management unit 15.

In the next step S310, the control unit 12 initializes variable n representing a display content to "1." As the variable n is incremented, the display contents are processed in order, i.e. from the first display content→the second display content→the third display content - - - . In S312, the control unit 12 searches for areas. In this processing, all the areas not yet allocated with any display content are searched for.

In S314, the control unit 12 excludes areas based on the hierarchical data structure. This processing is for excluding areas, even if not allocated with any display content, when corresponding higher-tier areas are allocated with display contents in the hierarchical data structure. For example, as illustrated in FIG. 4C, when area b is allocated with a content, areas d and e are excluded.

Figure 3C:
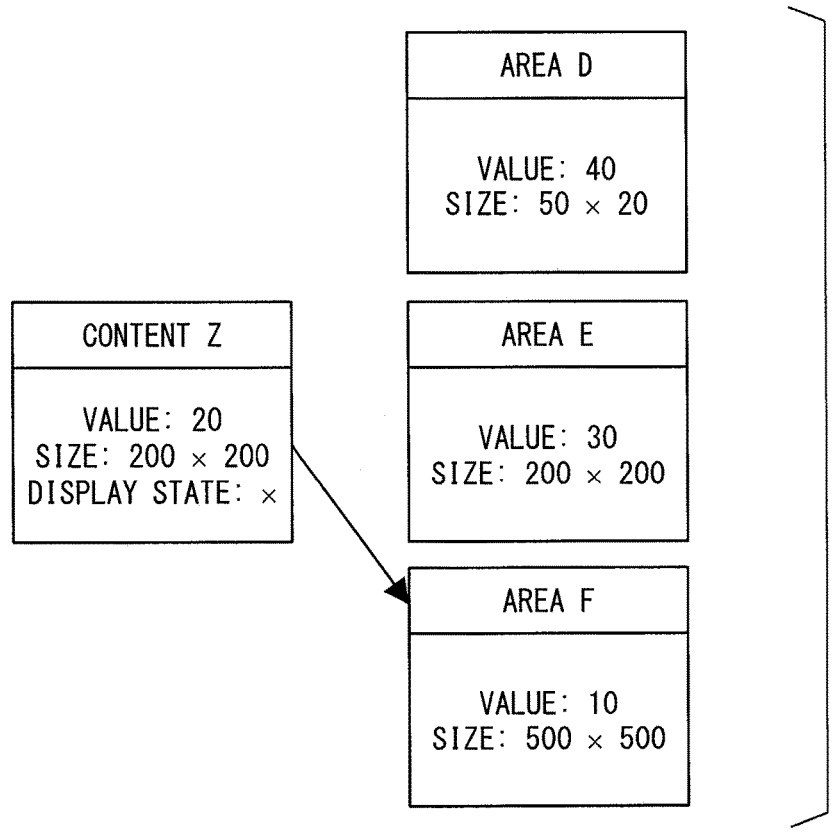
FIG. 3C is a diagram showing display content allocation based on attributes.

In S316, the control unit 12 excludes areas based on the content size and area size. This processing is for excluding areas whose area sizes are smaller than the content size of the processing target display content. For example, as illustrated in FIG. 3C, when content Z with a content size of 200×200 is to be allocated to an area, area D with an area size of 50×20 is excluded.

In S318, the control unit 12 excludes areas based on allocation management. To be specific, based on the correspondence between the processing-target display content and areas stored in the allocation management unit 17, those areas not corresponding to the processing-target display content are excluded. In S320, the control unit 12 allocates the processing-target display content to an area. This processing is for allocating the processing-target display content to, out of the areas that have been left as selectable areas through the processing up to S318, the area that is smaller than the information value of the processing-target display content and that has the largest area value. For example, in the example shown in FIG. 3C, content Z having information value of 20 is allocated to area F whose area value 10 is smaller than the information value 20 of content Z.

In S322, the control unit 12 determines whether or not variable n equals the number N of contents. This processing is for determining whether or not all display contents have been processed. When n=N (S322: YES), the control unit 12 advances to S326. In contrast, when n≠N (S322: NO), i.e. when there is any display content which has not been processed, the variable n is incremented in S324 and the processing starting from S312 is repeated. The processing of S310 to S324 is realized as a function of the display content allocation control unit 18.

In S326, the control unit 12 has the display content displayed. This processing is for displaying the display content in the allocated area and is realized as a function of the display layout control unit 19.

Concrete Example of Display Control (Case 1)

A concrete example (case 1) of the above-described display control processing (FIGS. 7 and 8) will be described with reference to FIG. 9. In this case, it is assumed that, as a result of audio output arbitration by the audio output arbitration unit 14, an audio content representing a warning sound of an ETC has been determined to be an output target. The ETC warning sound is composed of a non-verbal warning sound like a "bleep." In the present case, two display contents A and B are to be allocated to areas.

The display content A is image information representing an ETC warning like "Set an ETC card." The display content B is image information representing a wireless connection notification like "Wirelessly connected with a smartphone." It is also assumed that the information values of the display contents A and B have been set to 10 and 8, respectively.

The audio content set as an output target is of a non-verbal warning sound, so that its information amount is small. It is, therefore, assumed that, as an attribute of the audio content, the audio information amount is defined as "small." Note that, as illustrated in FIG. 8B, for the audio information amount "small," coefficient K is set to 2. It is also assumed that, as an attribute of the audio content, the ETC warning (display content A) has been defined as a display content associated with the audio content.

Of the two display contents A and B, the display content A is the one associated with the output-target audio content. Therefore, the information value of the display content A is changed based on coefficient K corresponding to the audio information amount of the output-target audio content. To be specific, by multiplying the initial information value 10 by coefficient K=2, the information value of the display content A increases to 20. As for the display content B not associated with the output-target audio content, the initial information value 8 is left unchanged.

Consequently, of the two display contents A and B, the display content A having higher information value is preferentially allocated to an area having high area value and is displayed in the area. An area with high area value may be, for example, an area with high visibility from the driver. Thus, it is possible, by increasing the information value of a display content associated with an audio content with a small audio information amount, to have the associated display content preferentially displayed in an area with high visibility. This enables information presentation using both an audio content and a display content.

Concrete Example of Display Control (Case 2)

A concrete example (case 2) of the above-described display control processing (FIGS. 7 and 8) will be described with reference to FIG. 10. In this case, it is assumed that, as a result of audio output arbitration by the audio output arbitration unit 14, an audio content representing an ETC-based toll notification has been determined to be an output target. The audio content for the ETC-based toll notification is composed of a relatively long verbal sound like "The toll is xx yen." For the present case, it is assumed that areas are allocated to two display contents A and B.

The display content A is image information representing an ETC-based toll display like "The toll is xx yen." The display content B is image information representing a wireless connection notification like "Wirelessly connected with a smartphone." It is also assumed that the information values of the display contents A and B have been set to 10 and 8, respectively.

The output-target audio content is a relatively long verbal sound having, by itself, an information amount enough to allow the user to grasp the contents of the presented information. Hence, it is assumed that, as an attribute of the audio content, the audio information amount is defined as "large." Note that, as illustrated in FIG. 8B, for the audio information amount "large," coefficient K is set to 0.5. It is also assumed that, as an attribute of the audio content, the ETC-based toll display (display content A) has been defined as a display content associated with the audio content.

Of the two display contents A and B, the display content A is the one associated with the output-target audio content. Therefore, the information value of the display content A is changed based on coefficient K corresponding to the audio information amount of the output-target audio content. To be specific, by multiplying the initial information value 10 by coefficient K=0.5, the information value of the display content A decreases to 5. As for the display content B not associated with the output-target audio content, the initial information value 8 is left unchanged.

As a result, of the two display contents A and B, the display content B having higher information value is preferentially allocated to an area having high area value and is displayed in the area. An area with high area value may be, for example, an area with high visibility from the driver. Thus, it is possible, by decreasing the information value of a display content associated with an audio content with a large audio information amount, to have a competing display content preferentially displayed in an area with high visibility. This enables information presentation using both an audio content and a display contend. In this way, it is possible to secure an opportunity to have, while achieving information presentation by an audio content, a competing display content preferentially displayed.

Technical Effects

The display-and-audio output control device 1 of the embodiment brings about the following technical effects.

Based on the audio information amount of the audio content set to the output target as a result of audio output arbitration, the information value of a display content corresponding to the audio content can be changed. To be specific, when the audio information amount of an audio content is larger, the information value of the associated display content can be made smaller and, when the audio information amount of an audio content is smaller, the information value of the associated display content can be made larger.

In this arrangement, when, for example, an audio content alone has an insufficient information amount for the information presentation, the increase in the information value of an associated display content enables the associated display content to be preferentially displayed in an area with high visibility. This enables appropriate information presentation using an audio content and a display content in combination.

Alternatively, when an audio content alone has a large amount information sufficient for the information presentation to some extents, the decrease the information value of the associated display content enables a competing display content to be preferentially displayed in an area with high visibility. Thus, while achieving information presentation using an audio content, a competing display content can be preferentially displayed, thereby achieving multifaceted information presentation. The present disclosure is not limited to the above-illustrated embodiments, and the embodiments can be modified in various ways without departing from the spirit and scope of the present disclosure.

What is claimed is:

1. A display-and-audio output control device comprising:
    a display control unit that, out of display contents set as display targets, preferentially allocates a display content having high display information value to a display area set on a screen of a display device mounted in a vehicle and displays the display content, wherein the display information value represents an importance degree of information;
    an audio control unit that allocates an audio content set as an output target to an audio output device mounted in the vehicle to have the audio contents audio-outputted, wherein when a plurality of the audio contents set as the output targets temporally overlap each other, the audio control unit determines, based on a predetermined arbitration criterion, an audio content to be preferentially outputted and has the determined audio content preferentially audio-outputted;
    an obtaining unit that obtains audio information amounts representing amounts of audio information represented by the audio contents and correspondence information representing correspondence between the audio contents and the display contents; and
    a management unit that manages the display information value representing the importance degrees of information represented by the display contents,
    wherein:
    based on the audio information amount of a specific audio content to undergo audio output execution by the audio control unit, the management unit changes the display information value of a specific display content associated with the specific display content as represented by the correspondence information of the specific audio content; and
    the display control unit employs the display information value changed by the management unit to allocate the specific display content set as the display target to the area for display.

2. The display-and-audio output control device according to claim 1, wherein
    the management unit makes smaller the display information value of the specific display content as the audio information amount of the specific audio content is larger, and makes larger the display information value of the specific display content as the audio information amount of the specific audio content is smaller.

* * * * *